Oct. 1, 1957

F. J. RAU 2,808,519

VOLTAGE EQUALIZER FOR UNBALANCED LOADS

Filed June 8, 1956

United States Patent Office

2,808,519
Patented Oct. 1, 1957

2,808,519
VOLTAGE EQUALIZER FOR UNBALANCED LOADS

Frank J. Rau, Pittsburgh, Pa., assignor to Westinghouse Electric Corporation, East Pittsburgh, Pa., a corporation of Pennsylvania Application June 8, 1956, Serial No. 590,150

5 Claims. (Cl. 307—14)

The invention relates generally to a voltage equalizer for unbalanced loads carried by a three-line three-phase power system.

The object of the invention is to provide for balancing the currents flowing in the three phases of a power system when a single-phase load is connected across one phase of the power system.

Other objects of the invention will, in part, be obvious and will, in part, appear hereinafter.

The invention accordingly comprises the features of construction, combination of elements and arrangement of parts which will be exemplified in the construction hereinafter set forth and the scope of the application of which will be indicated in the claims.

For a fuller understanding of the nature and objects of the invention, reference should be had to the following detailed description taken in connection with the accompanying drawing, in which.

Figure 1:
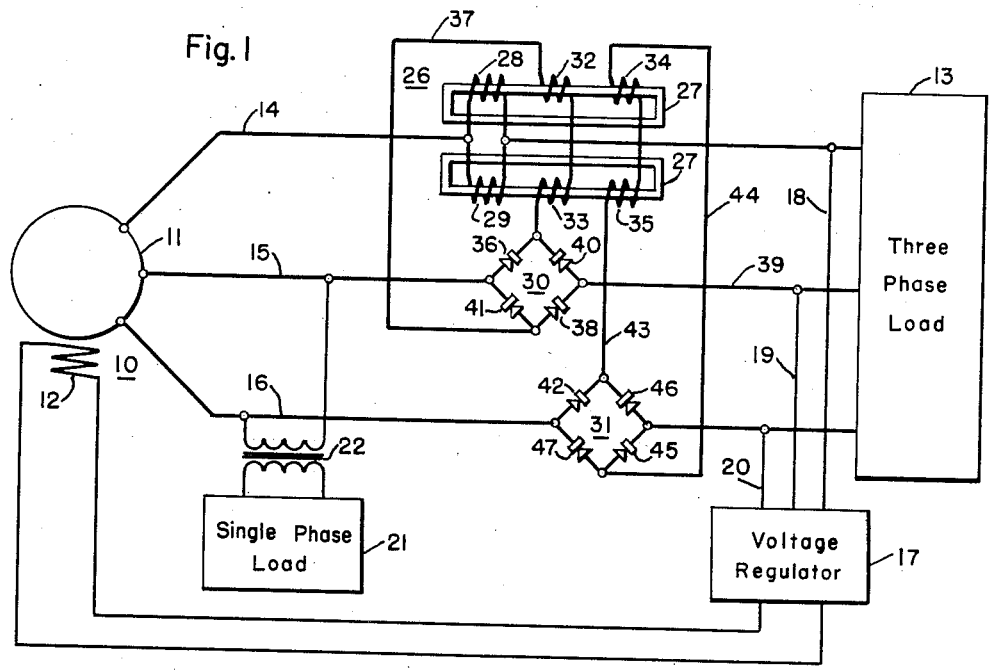
Figure 1 is a circuit diagram of a voltage equalizer for unbalanced loads showing the features of the invention.
Figure 3:
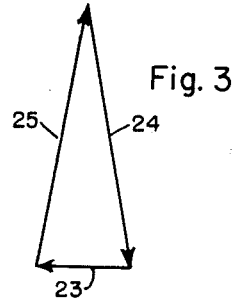
Figure 4:
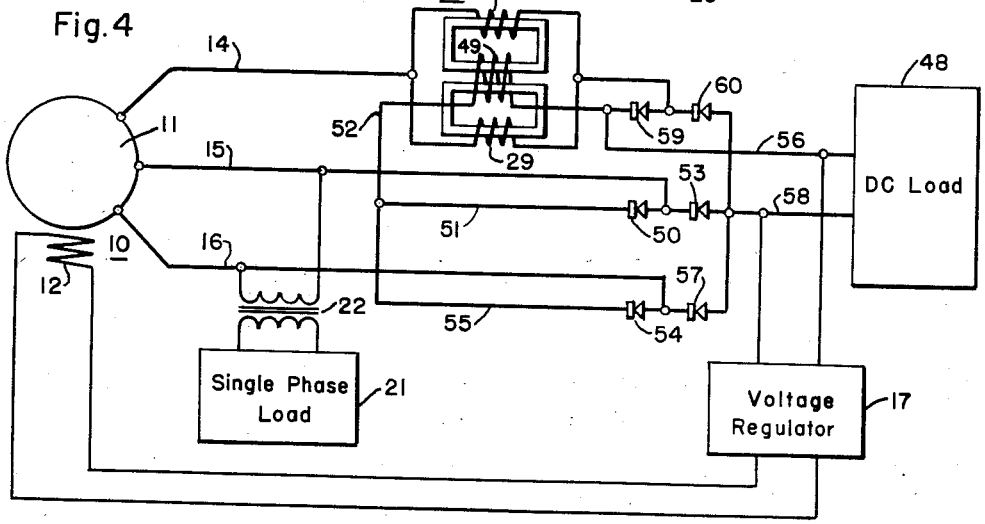

Fig. 3 is a vector diagram showing how the voltages between the phases are distorted when the three-phase power system has a single-phase load thrown across one phase of the power system without the voltage equalizer connected in the system, and Fig. 4 is a circuit diagram showing a modification of the voltage equalizer illustrated in Fig. 1 to adapt it for supplying a direct-current load and carrying a single-phase load across one phase of the power system.

Referring now to Fig. 1, an alternator shown generally at 10 comprises a rotor 11 and a field winding 12. The alternator may be of any well known type utilized for supplying a three-phase load such as required for motor vehicles and the like.

The alternator may be connected to the three-phase load 13 through a three-line three-phase power system. The three lines of the three-phase system are designated by the numbers 14, 15 and 16. A four-line three-phase system could also be employed.

A voltage regulator 17 responsive to the average voltage value may be employed. In practice a regulator of the type commonly used in automobiles is satisfactory. As shown, the regulator 17 is connected across the alternator field 12 and to the three lines 14, 15 and 16 of the three-phase power system by conductors 18, 19 and 20, respectively. The regulator commonly used in automobiles in conjunction with this type of system is of the vibrator type and is well known and need not be described in detail.

When the alternator is supplying a three-phase load 13 the voltage regulator will function to maintain the voltage across the phases substantially equal. The control of the voltage is effected through the control of the flow of current to the alternator field 12.

It often happens that a three-line three-phase system such as disclosed has to be utilized to supply a single-phase load 21. The single-phase load may be supplied at a voltage equal to the voltage across the lines 15 and 16. However, it is more usual to provide a transformer 22 for stepping the phase voltage up to the voltage ordinarily supplied to appliances and heating devices.

When a single-phase load is connected across the lines 15 and 16 of the three-phase power system the voltage across the phase carrying the load 21 drops while the voltage between the lines 14 and 15 and 14 and 16 increases. If a three-phase average voltage sensing voltage regulator is employed to control the field current of the alternator, the regulator does not sense the drop in the voltage across the lines 15 and 16 because the increase in the voltage across the lines 14 and 15 and 14 and 16 compensates for the drop in voltage across the lines 15 and 16. In such a system the regulator is inoperative to control the phase voltages. It does, however, maintain the average value of the three-phase voltages at proper level.

Figure 2:
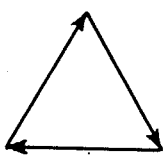
Fig. 2 is a vector diagram showing how the voltages are balanced between the phases by the regulator before a single-phase load is connected across one phase of the three-phase power system.

The vector diagram of Fig. 2 shows how the voltages are maintained equal for the three phases when the alternator is supplying a three-phase load and no single-phase load is connected across the lines 15 and 16. The regulator 17 keeps the voltages substantially balanced.

When a single-phase load, such as 21, is connected across the lines 15 and 16 the voltages become distorted as shown in Fig. 3. The voltage illustrated by the vector 23 drops to about one-twentieth or less of the voltage illustrated by the vectors 24 or 25. Since the voltage across the single-phase load drops so low, very little single-phase power can be taken from the alternator and the voltages of the three-phase loads are unbalanced. There would be a danger of the voltages represented by the vectors 24 and 25 damaging the equipment connected across the phases 14 and 15 and 14 and 16.

In order to maintain a proper balance in the three-phase system when a single-phase load is connected across the lines 15 and 16, a saturable reactor shown generally at 26 is connected in the line of the three-phase system that is not connected to the single-phase load. In this instance, since the single-phase load is connected across the lines 15 and 16, the saturable reactor is connected in the line 14.

The saturable reactor 26 comprises a core 27 and two coils or windings 28 or 29 which are connected in parallel circuit relationship in the line 14. The number of turns in the coils 28 and 29 will depend on the specification to which the system is designed.

In addition to the saturable reactor 26, well known single-phase full-wave bridges shown generally at 30 and 31 will be connected into the lines 15 and 16, respectively, of the three-phase power system. These bridges in conjunction with the saturable reactor 26 will permit the supplying of the three-phase load 13.

Two control windings 32 and 33 are connected in series circuit relationship and disposed on the core 27 in inductive relationship with the coils 28 and 29, respectively, of the saturable reactor 26. The series-connected coils 32 and 33 are connected across the bridge 30 as illustrated. Control windings 34 and 35, connected in series circuit relationship, are also dispsoed on the saturable reactor core 27 in inductive relationship with the coils 28 and 29, respectively. The windings 34 and 35 are connected across the bridge 31 as shown.

If the control windings 32 and 33 have the same number of turns as the control windings 34 and 35 and if the power windings 28 and 29 have four times as many turns as the control windings 32, 33, 34 and 35, the current in line 14 will be equal to one-half the sum of the line currents in lines 15 and 16. Therefore, the currents flowing in the lines 14, 15 and 16 of the three-phase power system will be substantially equal to each other under all conditions. This rule will enable anyone skilled in the art to properly design the saturable reactor and control windings.

When the system has been connected as hereinbefore described the voltage regulator 17 will become just as sensitive to the voltage between the lines carrying the single-phase load as it is to the other two phases of the power system. Any drop in voltage between the lines carrying the single-phase load will cause the voltage regulator to feed more current to the alternator field winding, thereby generating a higher voltage to bring the loaded line voltage back to its proper value.

The generated voltage of the other two phases will also be increased but the saturable reactor will absorb the excess voltage so that the voltage at the three-phase load will remain balanced and at the proper level.

In order to show how direct current is supplied to the control windings the circuits will be traced. Assuming that the current flowing in line 15 in one-half of the cycle flows through the rectifier 36, coils 33 and 32, conductor 37 to the lower terminal point of the bridge 30, rectifier 38, conductor 39 to the load 13, then in the next half of the cycle the current will flow in the opposite direction in the conductor 39 through rectifier 40, the upper terminal of the bridge 30, through coils 33 and 32 in the same direction as in the first half of the cycle, conductor 37 to the lower terminal of the bridge 30, rectifier 41 through the line 15 to the alternator.

When current flows in the line 16 toward the bridge 31, it flows through the rectifier 42, conductor 43, the series connected control windings 35 and 34, conductor 44 to the lower terminal of the bridge 31, rectifier 45 to the three-phase load 13. On the next half of the cycle the current will flow in the opposite direction in the line 16 to the bridge 31 through rectifier 46, conductor 43, in the same direction to the series connected control windings 35 and 34, conductor 44, rectifier 47 back to the line 16.

In the modification illustrated in Fig. 4, the alternator is utilized for supplying a direct-current load 48. In this case it is not necessary to provide separate rectifiers to convert the alternating currents to direct currents for the control windings employed in conjunction with the saturable reactor 26. Further, part of the rectified output is supplied to the control windings employed in conjunction with the saturable reactor.

As shown, a three-phase full-wave bridge will be employed instead of the single-phase full-wave bridge utilized in the system illustrated in Fig. 1. Therefore, a single control winding 49 will be connected in series circuit relationship with the sections of the three-phase full-wave bridge connected into the lines of the three-phase power system across which the single-phase load is connected.

When the alternator is supplying current to the direct-current load and the single-phase load and current is flowing in the line 15, during one half of the cycle it will flow through the rectifier 50, conductors 51 and 52 to the control winding 49 on the core of the saturable reactor 26 and the conductor 56 to the load 48. Rectifier 53 blocks the flow of current in the opposite direction. When current flows in line 16 during one half of the cycle it will flow through rectifier 54, conductors 55 and 52, the control winding 49 and conductor 56 to the direct-current load. The rectifier 57 blocks the flow of current directly to the direct-current load. The return circuit through the direct-current load is through conductor 58. In one instance the return circuit from load 48 is through rectifier 53 and line 15 and the other through rectifier 57 and line 16.

The circuit of the saturable reactor extends through line 14, the windings 28 and 29 connected in parallel, rectifier 59 and conductor 56 to the load 48. The return circuit from the direct-current load is through conductor 58 and rectifier 60, the power windings 28 and 29 to line 14.

The voltage regulator 17 will respond to changes in voltage in the phase across which the single-phase load is connected. Any drop in voltage will cause the voltage regulator to feed more current into the alternator field winding thereby generating a higher voltage to raise the loaded line voltage to its proper value.

Since certain changes may be made in the above construction and different embodiments of the invention could be made without departing from the scope thereof, it is intended that all matter contained in the above description or shown in the accompanying drawing shall be interpreted as illustrative and not in a limiting sense.

I claim as my invention:

1. In a voltage equalizer for a three-phase power system for supplying a three-phase load and which will carry a single-phase load connected across one phase, in combination, a voltage regulator for keeping the voltages between phases balanced when the three-phase power system is supplying a three-phase load, a saturable reactor connected into one line of the three-phase power system, control windings disposed in inductive relationship with the saturable reactor, single-phase full-wave bridges connected in the lines of the three-phase system across which the single phase load is connected, one bridge being connected to each control winding, the combination cooperating to substantially equalize the currents flowing in the three-line system when the single-phase load is being supplied.

2. In a voltage equalizer for a three-phase power system for supplying a three-phase load and which will carry a single-phase load connected across one phase, in combination, a voltage regulator for keeping the voltages between the phases balanced when the three-phase power system is supplying a three-phase load, a saturable reactor comprising a plurality of cores and a power winding on each core, a plurality of control windings disposed on each core in inductive relationship with the power windings, single-phase full-wave bridges connected in the lines of the three-phase system across which the single-phase load is connected, the control windings on one core being connected in series circuit relationship with the control windings on the other cores thereby arranging them in series, each pair of control windings being connected to a single-phase full-wave bridge, the combination of single-phase full-wave bridges, control windings and power windings of the saturable reactor cooperating to equalize the current flow in the lines of the three-phase system when the single-phase load is being supplied.

3. In a voltage equalizer for a three-phase power system for supplying a three-phase load and which will carry a single-phase load connected across one phase of the three-phase system, in combination, a voltage regulator for keeping the voltages between the phases balanced when the three-phase power system is supplying a three-phase load only, a saturable reactor comprising a plurality of cores and a power winding on each core connected into one line of the three-phase power system, a plurality of control windings disposed on each core in inductive relationship with the power windings of the saturable reactor, single-phase full-wave bridges connected in the lines of the three-phase system across which the single-phase load is connected, one bridge being connected to a control winding on each core, the control windings connected to each bridge being connected in series circuit relationship, the single-phase full-wave bridges, the control windings and power windings being cooperative to equalize the currents flowing in the lines of the three-phase system.

4. In a voltage equalizer for a three-phase power system for supplying a direct-current load and which will carry a single-phase load connected across the line of one phase of the power system, in combination, a voltage regulator for keeping the voltages between the phases balanced when the three-phase power system is supplying the load, a saturable reactor connected into one line of the three-phase power system, the saturable reactor comprising a power winding and a plurality of control windings disposed in inductive relationship, a three-phase full-wave bridge connected in the lines of the three-phase power system cooperating to deliver current to a direct-current load, the sections of the three-phase full-wave bridge connected in the lines carrying the single-phase load being connected in parallel circuit relationship and to the control winding of the saturable reactor which in turn is connected to the direct-current load, the saturable reactor windings and three-phase full-wave bridge cooperating to equalize the currents flowing in the lines of the three-phase system when the single-phase load is connected across one phase of the power system.

5. In a voltage equalizer for a three-phase power system for supplying a direct-current load and which will carry a single-phase load connected across one phase, in combination, a voltage regulator for keeping the voltages between the phases balanced when the three-phase power system is supplying the direct-current load, a saturable reactor connected in one line of a three-phase system, the saturable reactor comprising a core and a power winding including a plurality of coils connected in parallel circuit relationship, a three-phase full-wave bridge connected in circuit relationship in the three-phase system, the sections of the three-phase full-wave bridge connected in the lines of the three-phase system carrying a single-phase load being connected in parallel circuit relationship and to the control winding of the saturable reactor, the combination cooperating to equalize the currents flowing in the lines of the three-phase system when current is being supplied to the single-phase load.

No references cited.